(12) United States Patent
Morgan et al.

(10) Patent No.: US 6,782,272 B2
(45) Date of Patent: Aug. 24, 2004

(54) NETWORK CONTROL HAVING SELECTIVE REVERSE MOBILE FRAME BIASING

(75) Inventors: William K. Morgan, Marengo, IL (US); Donald P. Cordell, Woodstoock, IL (US); William R. Bayer, Wilmette, IL (US)

(73) Assignee: Motorola, Inc., Schaumburg, IL (US)

( * ) Notice: Subject to any disclaimer, the term of this patent is extended or adjusted under 35 U.S.C. 154(b) by 40 days.

(21) Appl. No.: 10/267,758

(22) Filed: Oct. 9, 2002

(65) Prior Publication Data

US 2004/0072541 A1 Apr. 15, 2004

(51) Int. Cl.[7] .............................. H04B 7/00; H04Q 7/20
(52) U.S. Cl. ...................... 455/522; 455/442; 370/335; 370/331; 370/332
(58) Field of Search ........................... 455/522, 70, 442, 455/432.1, 436–439, 524, 13.4; 370/332, 252, 335, 342, 331, 320

(56) References Cited

U.S. PATENT DOCUMENTS

| | | | |
|---|---|---|---|
| 6,046,990 A | | 4/2000 | Chennakeshu et al. |
| 6,058,107 A | | 5/2000 | Love et al. |
| 6,393,276 B1 | * | 5/2002 | Vanghi ..................... 455/422.1 |
| 6,397,043 B1 | * | 5/2002 | Kang ........................... 455/69 |
| 6,490,266 B1 | * | 12/2002 | Kim ............................ 370/342 |
| 6,501,958 B1 | * | 12/2002 | Hwang et al. ............... 455/522 |
| 6,628,958 B1 | * | 9/2003 | Kamel et al. ................ 455/522 |
| 2002/0094837 A1 | * | 7/2002 | Hamabe et al. ............. 455/522 |
| 2002/0105375 A1 | * | 8/2002 | Sorokine .................... 329/345 |

OTHER PUBLICATIONS

JaeHeung Kim et al, "The performance analysis of reverse power control for DS/CDMA system." 1997 IEEE: 0–7803–4298–4/9.*

* cited by examiner

*Primary Examiner*—Nay Maung
*Assistant Examiner*—Edan Orgad
(74) *Attorney, Agent, or Firm*—Fitch, Even, Tabin & Flannery

(57) ABSTRACT

Selective reverse mobile frame biasing is provided for improved network control between a mobile unit (102) and a base station (132) responsive to power control bits from the base station. Signaling messages (124) received at the base station (132) are monitored to identify signaling messages requiring the mobile unit to send a response containing a critical signaling message. The base station (132) informs the mobile unit (102) to send the response containing the critical signaling message with an increased power bias for the duration of the message. Transmission power of the mobile unit (102) is allowed to decay after the critical signaling message is sent.

30 Claims, 3 Drawing Sheets

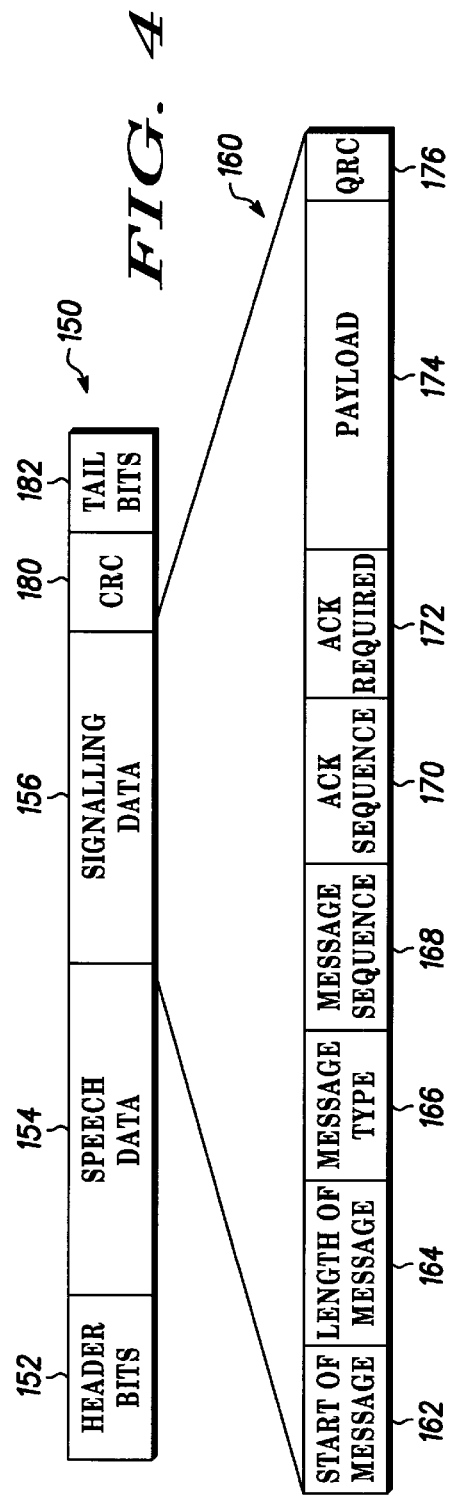
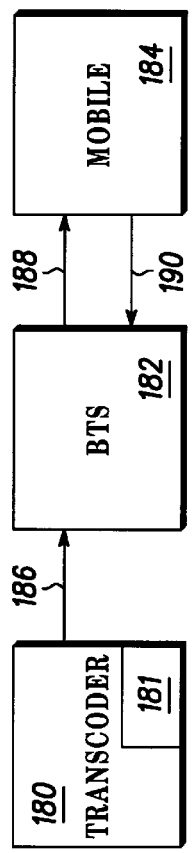
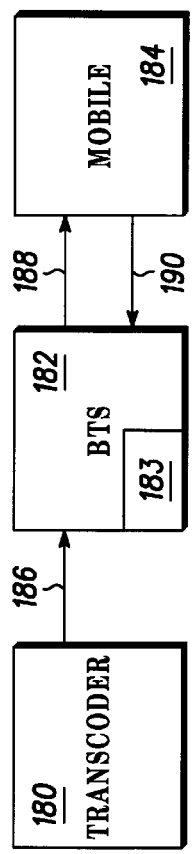
FIG. 4
FIG. 5
FIG. 6

NETWORK CONTROL HAVING SELECTIVE REVERSE MOBILE FRAME BIASING

BACKGROUND OF THE INVENTION

1. Field of the Invention

The invention relates generally to communication systems between two units, where one unit controls transmission of the other unit and more particularly to the control of power levels associated with reverse mobile frame transmissions.

2. Description of the Related Art

Communication systems, such as Code Division Multiple Access (CDMA) systems and Time Division Multiple Access (TDMA) systems and the like communicate messages between infrastructure equipment and mobile units. As used herein, a forward message refers to a message generated by cellular infrastructure equipment and transmitted for reception by a mobile communication unit, and a reverse message refers to a message generated by a mobile communication unit such as a mobile cellular phone, to the cellular infrastructure equipment.

Power control is an important function in most communication systems, and is essential to the proper operation of second and third generation cellular systems of the DS-CDMA type. Power control is used to maintain sufficient communication link quality and information through put while using minimum power levels to maximum system capacity. Changing the power levels of the forward communication links used by a Base Transceiver Station (BTS) to transmit information to mobile stations is referred to as forward power control. Changing the power levels of the reverse communication links by the mobile station to transmit information to serving BTSs is referred to as reverse power control.

In a typical CDMA system, when entering the boundary region between base transceiver stations, a mobile station transitions from communicating with one base transceiver station to communicating with both base transceiver stations simultaneously. Thus, the communication is not interrupted and the speech quality is not degraded, even temporarily. This multiple link communication is commonly referred to as soft-hand off. Significant diversity benefit is derived by the mobile station due to the receiving and combining of multiple signal paths from the serving base station storing soft-hand off, thereby allowing a net drop in forward link power. Soft-hand off can involve two or more BTSs.

It is important to the proper and efficient operation of such systems that critical system-level information such as signaling frames be efficiently and reliably conveyed at low error rates so that system controls may be implemented as expeditiously as possible.

BRIEF DESCRIPTION OF THE DRAWINGS

FIG. 4 is a schematic diagram of a voice frame employed in practicing the present invention;

FIG. 5 is a schematic diagram of a system portion utilizing centralized power control; and FIG. 6 is a schematic diagram of a system portion utilizing distributed power control.

DETAILED DESCRIPTION OF THE PREFERRED EMBODIMENTS

Figure 1:
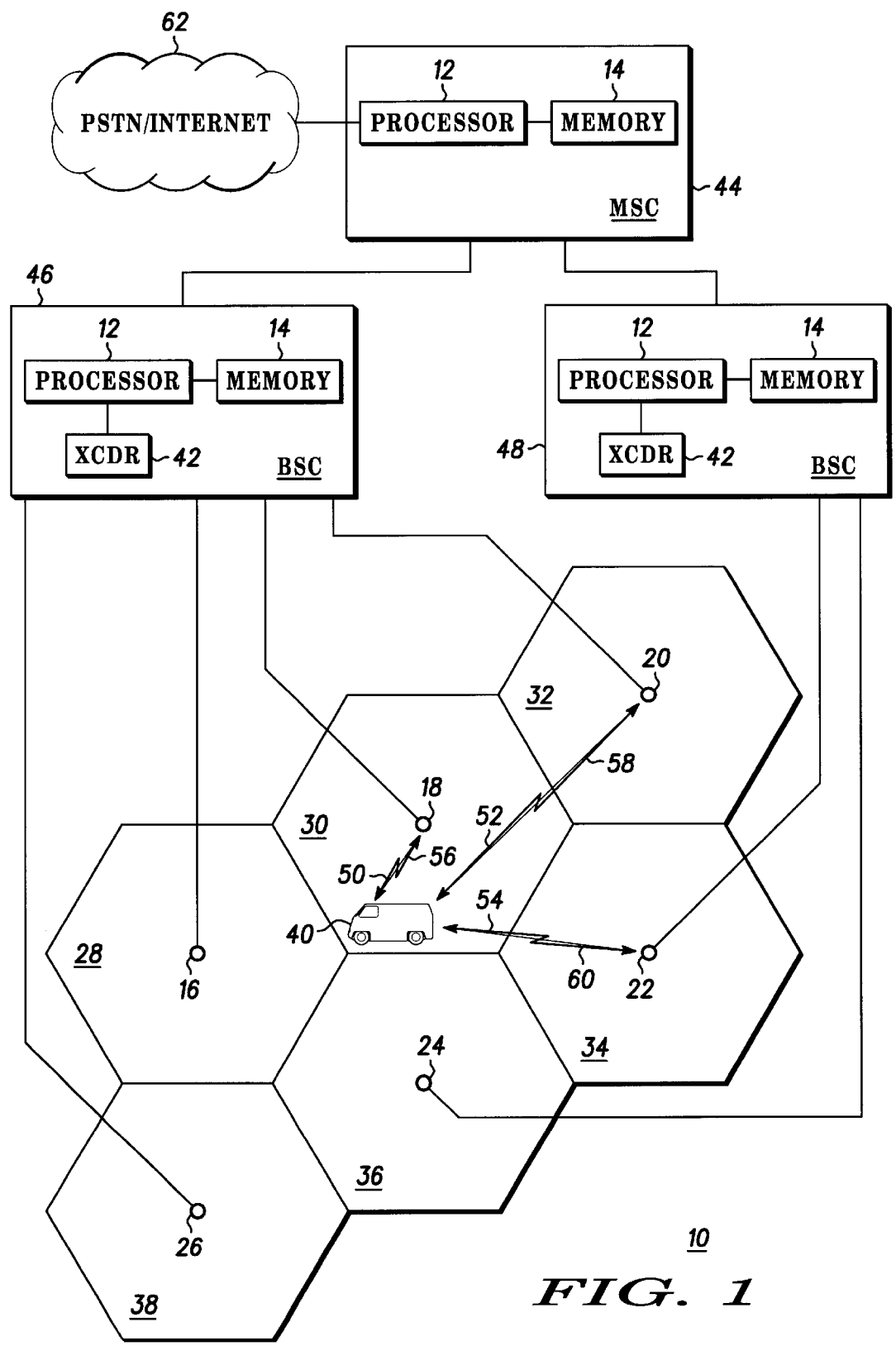
FIG. 1 is a schematic diagram of a wireless communication system in accordance with the preferred embodiment of the present invention.

The present invention provides selective increase of power for those reverse mobile frames which are indicated as containing critical system-level information such as signaling. Due to environmental factors and operating constraints, signaling and other critical frame types are erased a certain percentage of the time and must be re-transmitted several times by the mobile to be received intact by the base station. Missed signaling messages can lead to dropped calls. The present invention alleviates this problem by anticipating the reception of critical frames from the mobile. The base station advises the mobile to increase transmit power on the reverse link before the critical frame is transmitted and to maintain the increase power bias for a suitable number of frames.

Typically, the critical frames are those sent in response to an instruction or communication protocol, and whose structure, especially the length or duration of the critical frames is predetermined. The base station advises the mobile to continue the increase power bias according to a known frame scenario, e.g., a "3 to 8 frame Status Response Message" until transmission of the critical portion is concluded. Although selective frame biasing according to principles of the present invention can be used to boost the power of any frame received from the mobile on the reverse link, the present invention has found immediate application in augmenting the reception of signaling frames. In a communication system, signaling frames are vital to sustaining the communication link. Therefore, it is advantageous to assure that the frame erasure rate (FER) of signaling frames is lower than that of generic data frames. According to principles of the present invention, the base station instructs the mobile to increase it's transmit power during the response period in which critical frames are transmitted, to increase the probability that the critical frames will be successfully received.

In most communication systems and cellular systems in particular, there are signaling frames which are needed to negotiate system parameters and adjust the radio frequency and air interface parameters of the communication session. In a cellular system, the base station sends signaling messages to the mobile and expects answering signaling messages in return. Based on the time necessary for the mobile to evaluate the incoming message and send a response, the base station is aware of the time that the answering signaling message should be received on the reverse link. For purposes of describing but not limiting the present invention, signaling frames are considered as examples of critical frames which require preferential increase power on the reverse link.

The designation of critical frames can be extended, if desired to different types of frame content. However, increased interference due to increase power transmission levels will usually prompt the system operator to limit increase power bias to a minimum number of frame types which are most critical to system operation. Frames chosen to require increased power bias are distinguished from "common" data frames in that their content is deemed to be vital to maintaining the communications link, and their approximate time of arrival at the base station is known. Preferably, the critical frames have a known or estimable duration.

The present invention can be readily employed with virtually any communication system having remote units whose transmission power levels are remotely controllable by sending appropriate instructions to the remote unit. As will seen herein, the present invention is particularly adapted to the "safe guarding" of the most critical system-level data such as signaling data, sent from remote units. In particular, the present invention has found immediate application with cellular telecommunication systems where critical system-level data appears along with less critical traffic such as voice data or digital network data communicated over wireless systems, such as systems of the Code Division Multiple Access (CDMA) type.

Referring to the drawings, FIG. 1 illustrates a wireless communication system 10, such as a code division multiple access (CDMA) digital radiotelephone system. Fixed communication units such as Base Transceiver Stations (BTS) 16, 18, 20, 22, 24, and 26, also referred to as cells, communicate with a mobile station 40, also referred to as a mobile unit, operating within area 30. Areas 28, 30, 32 and 38 are served by BTSs 16, 18, 20 and 26 respectively, while areas 34 and 36 are served by BTSs 22 and 24. BTSs 16, 18, 20 and 26 are coupled to a Base Station Controller (BSC) 46, which comprises, among other things, a transcoder (XCDR) 42, a processor 12, and a memory 14, and which is in turn coupled to a Mobile Switching Center (MSC) 44, also comprising a processor 12, and a memory 14. Similarly, BTSs 22 and 24 are coupled to BSC 48 which comprises, among other things, a XCDR 42, a processor 12, and a memory 14, and which in turn is also coupled to MSC 44. BSCs 46 and 48 may be referred to as a Base Station Subsystem (BSS). A BSS may also be defined as a single BSC and its associated BTSs. MSC 44 is coupled to the public switched telephone network (PSTN) 62. The PSTN, MSC, and BSS are generically referred to as the infrastructure.

Wireless communication between BTSs 16, 18, 20, 22, 24, and 26 and mobile unit 40 occurs via radio frequency (RF) channels which provide physical paths over which digital communication signals such as voice and data are transmitted. Base-to-mobile unit communications are said to occur on a forward link, while mobile-to-base unit communications are referred to as being on a reverse link.

As shown in FIG. 1, a communication signal 50 has been transmitted on the forward link channel such as a traffic channel, by base station 18 to mobile station 40. Additionally, a communication signal 56 has been transmitted on a reverse link channel such as a traffic channel by mobile station 40 in response to communication signal 50 from base station 18.

In cellular communication protocols, remote, mobile units send messages when queried by a central control or "base" station. The present invention detects queries for critical information being requested in a forward signaling message. Forward signaling messages are intercepted or "snooped" to determine whether a response from the mobile unit is indicated, and if so, whether the response called for would contain critical information vital to maintaining the communications link. Modules for "snooping" are indicated at 181 in FIG. 5 and 183 in FIG. 6. If system-critical responsive data is anticipated, action is taken by the base station to increase the mobile's reverse power control outer loop set point or other suitable control such that power of the reverse signaling frame carrying the system-critical data is increased. According to principles of the present invention, increase power bias is implemented by the base station, by sending appropriate power control signals to the mobile.

In general, commands can be sent either by the base station (for distributed power control systems—see FIG. 7) or the transcoder (for centralized power control systems—see FIG. 6) to selectively and temporarily increase the reverse mobile power levels used to transmit system-critical data. The reverse traffic of the system is typically broken into distinct frames of preset format and duration. For systems of undetermined over the air transmit time, conventional software can be employed to provide a calculated estimate of over the air transmit time ("best case mobile message turn-around time). Thus, the reverse over the air transmit time for the system-critical data is determined or estimated by the controlling entity, either the base station or the transcoder.

The base station monitors the duration of the reverse signaling message and maintains the mobile's power control set point at the elevated level until the critical message is complete. After the system-critical data communication session is ended, the power control of the mobile unit is allowed to decay to a predetermined set point or other preferred operating level, such as a level needed to maintain a predetermined Frame Error Rate (FER) target. The power control described above contemplates an "open loop" environment. If desired, according to other principles of the present invention, a "closed loop" power control can be enabled earlier, during call set up, if desired. Accordingly, either open loop or closed loop power control can be used to provide reverse link increase power bias according to principles of the present invention.

Figure 2:
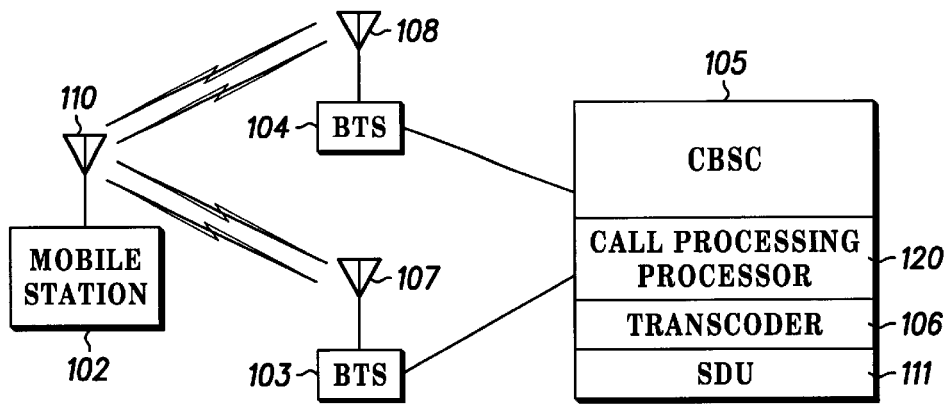
FIG. 2 is a schematic diagram of the wireless communication system of FIG. 1, in simplified form.
Figure 3:
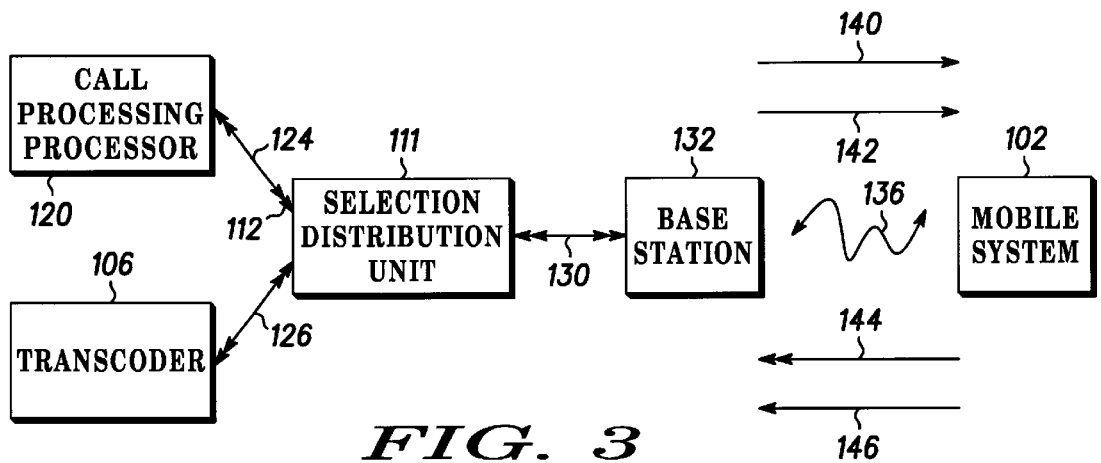
FIG. 3 is a schematic diagram of a wireless communication system showing a flow of messages between various components.

The wireless telecommunication system shown in FIG. 1 is also shown in a simplified version in FIGS. 2 and 3. Referring initially to FIG. 2, communication system 100 comprises a mobile station 102, a first base transceiver station 104, a second base transceiver station 103, and a Centralized Base Station Controller (CBSC) 105. CBSC 105 comprises a transcoder 106 and a selection distribution unit 111. System 100 preferably comprises a plurality of mobile stations and base transceiver stations, but only one mobile station and two base transceiver stations are depicted in FIG. I for clarity. System 100 may comprise virtually any communication system (CDMA or TDMA, for example) that transmits signaling messages and requires accurate delivery and receipt by mobile stations. Base stations 103 and 104 may comprise, for example, a "MOTOROLA SC9600" base transceiver station. First base station 104 comprises a transceiver 108, a transmitter and a receiver. Second base station 103 comprises a transceiver 107, a transmitter and a receiver. Transceivers 107 and 108 transmit over-the-air RF signals to be received by mobile unit 102. Such transmissions are well known in the art and will not be described further. Signals transmitted from base stations 103 and 104 to mobile unit 102 are referred to herein as "forward" traffic frames or as "forward" link messages containing forward signaling and other types of messages. Transceivers 107 and 108 receive messages from mobile unit 102 as is known in the art. Such messages are referred to herein as "reverse" traffic frames or link messages, and contain reverse signaling and other types of messages.

Mobile unit 102 preferably comprises a cellular telephone unit capable of communicating with base transceiver stations 103 and 104. In a preferred embodiment, mobile unit 102 may also be a wireless data terminal or a videophone. Mobile unit 102 comprises a transceiver 110 that comprises a transmitter and the receiver, as is known in the art. Mobile unit 102 communicates with base stations 103 and 104 by transmitting messages by the transceiver 110 located therein on a reverse link, and by receiving messages generated by base stations 103 and 104 at transceiver 110 located therein on the forward link.

The Selection Distribution Unit (SDU) 111 receives a signaling frame from the Call Processing Processor (CPP) 120 located within CBSC 105. With additional reference to FIG. 3, the CPP 120 sends and receives signaling messages with SDU 111 along path 124. Speech data is transmitted between transcoder 106 and SDU 111 along path 126. A path 130, typically comprising a TI span provides communication between SDU 111 and base station 132. SDU 111 applies its frame importance criteria to the signaling frame type and decides that the answering signaling frame from the mobile 102 should receive power increase bias treatment.

The SDU 111 marks the time that the signaling message was sent to the mobile 102 an looks up the estimated time of arrival of the answering signaling message from the mobile 102, using predetermined look up table information associated with SDU 111. As mentioned above, the estimated time of arrival may be either calculated in a well behaved data session or may be estimated using known techniques when the time of arrival cannot be accurately predicted. At the earliest time of arrival of the critical signal message from mobile 102, SDU 111 notifies base station 132 to send conventional power-up bits on the power control sub-channel, using known techniques. These power-up bits direct the mobile 102 to increase its power by a predetermined amount ("the power increase bias") during the time that the mobile transmits the critical answering signaling message to base station 132.

Preferably, conventional software techniques are employed to "snoop" the critical reverse signal messages and maintain the increase critical signal message duration. When the critical frame message is deemed to be fully received, SDU 111 discontinues increase power bias, allowing power control of the mobile 102 to return to normal operation either gradually in a "decay" mode, or in a more rapid, forced or controlled mode.

Common data transmission voice frames from transcoder 106 are received at SDU 111 and are forwarded on TI span line 130. When a signaling message is sent from CPP 120 to SDU 111, SDU 111 inserts the signal message into the voice data stream. This is done by either using the whole frame from signaling which is called "blank and burst" or by splitting the frame between voice and signaling information which is called "dim and burst". The present invention is directed to the majority of signaling messages which fit in a single frame and also exceptional instances when multiple frames are required to convey the signaling messages.

Base station 132 receives the voice and signaling frames from SDU 111 and transmits them over the air to mobile 102 which demodulates and decodes the frames. Mobile 102 processes the voice frames and extracts the signaling information from the frames. Mobile 102 responds with its own signaling response message 146. Over The Air (OTA) transmissions are indicated by an air interface 136. As indicated in FIG. 3, the air interface path 136 contains a number of communications comprising forward signaling messages indicated at 140, forward power control bits indicated at 142, channel energy estimation indicated at 144 and reverse signaling messages indicated at 146.

While base station 132 and mobile 102 are processing frames, they are also processing power control information. Base station 132 sends power control bits 142 to the mobile 102 based on its measurement of the energy level of the signal from mobile 102. Mobile 102 is directed to change its power by one dB 16 times during every frame by the power control bits 142. Base station 132 performs an energy estimate 16 times per frame and instructs mobile 102 to raise or lower its power based on whether the energy estimate is less than or greater than a given energy threshold. Power management based upon channel energy estimation is well known, and virtually any commercially available technique can be used for this purpose.

FIG. 4 shows a break down of a voice frame 150 with signaling information added. An initial part of the frame designated at 152 is comprised of the header bits which indicate whether or not the frame contains signaling information. A speech portion 154 contains speech data if the frame is a "dim and burst" type, assuming the frame contains both voice data and signaling. A signal portion 156 is the signaling message part of the frame. The length of signaling data varies depending upon what type of signaling message is being sent. The header for the signaling portion 156 is indicated by reference numeral 160. A Start of Message Bit 162 is located at the beginning of signaling data portion 156. Following the Start of Message Bit is an eight bit Length of Message field 164, and an eight bit Message Type 166 which indicates the type of signaling message.

The Message Sequence Number field (three bits) 168 allows mobile 102 receiving the message to verify that all signaling messages are being received in sequence. The ACK Sequence field 170 (one bit) allows the mobile to verify that acknowledgements (ACKs) are received in order. The ACK Required bit 172 indicates whether or not the mobile needs to send an acknowledgement to the message. The ACK required is set for messages that do not have an explicit response.(e.g. the service connect/service connect complete message pair in IS2000). The Payload field 174 is the actual signaling message. The length of the Payload field varies from one message to another. The Cyclic Redundancy Check (CRC) 176 often referred to as the "inner CRC" verifies the integrity of the signaling part of the frame. The CRC field 176 has a length of sixteen bits. After the signaling portion of the frame, an outer CRC 180 verifies the integrity of the frame as a whole. CRC field 180 has a length ranging between eight and twelve bits, depending on the frame rate. Tail bits 182 allows the mobile to verify the synchronization of the transmission from the base station.

As mentioned above, the reverse power control outer loop set point may be increased either by the base station (distributed power control) or transcoder (centralized power control). Scenarios illustrated the power control schemes will now be described with reference to FIGS. 5 and 6. Referring to FIG. 5, Centralized Power Control arrangement is described with respect to a transcoder 180, Base Transceiver Station (BTS) 182 and a mobile 184. Transcoder 180 determines that a signaling message requires an explicit response or has the ACK Required field (see field 172 in FIG. 4) set to one. In the arrangement illustrated in FIG. 6, a "snoop" module 181 is provided in transcoder 180 which monitors the transmitted signaling messages to determine whether a critical portion and therefore the need for selective bias is contained in the message stream. A power control set point increase command is sent to BTS 182 along path 186. The BTS 182 sends power-up bits to mobile 184 along path 188 based on change in the power control set point. The mobile then sends signaling frames at increase power in the reverse direction, along path 190. If the signaling message length is greater than one frame BTS 182 maintains bias (i.e., power increase) for the duration of the signaling message.

Referring now to FIG. 6, operation with Distributed Power Control is described. Transcoder 180 sends signaling frames along path 186 to BTS 182. BTS intercepts the signaling frames at 183 and determines that the signaling message has an explicit response or has the ACK Required field set to one (see reference number 172 in FIG. 2). A power control set point is increased. The BTS increases the power control set point, with power-up bits being sent to mobile 184 along path 188. The mobile sends signaling frames in a reverse direction at increase power, along path 190. If the signaling message length is greater than one frame, BTS 182 maintains power increase bias for the duration of the signaling message.

Although the terms "base station" and "mobile unit" have been used herein, it will be appreciated that the present invention can be used with communication units of virtually any type, whether mobile or wireless or not, where a remote transmitting unit can be remotely controlled to send critical responses at elevated power, or other strength-related volume, levels.

While the principles of the invention have been described above in connection with a specific apparatus, it is to be clearly understood that this description is made only by way of example and not as a limitation on the scope of the invention.

What is claimed is:

1. An over-the-air communication system for controlling communication between a mobile unit and an infrastructure, comprising:

a base receiver station comprising a receiver configured to receive communication signals from the mobile unit;

a selection distribution unit operatively coupled to said receiver for identifying a critical signaling message transmitted by the mobile unit that requires the mobile unit to send a critical response comprising a critical signaling message and for forwarding said critical signaling message to said base station along with an increase power bias command; and said base station responsive to said increase power bias command to send an increase power bias message to said mobile unit instructing said mobile unit to respond to said critical signaling message by sending a critical response to said base station with an increased power bias.

2. The system according to claim 1 further comprising a transcoder for sending speech frames to said selection distribution unit.

3. The system according to claim 2 wherein said selection distribution unit combines said signaling messages with said speech frames for transmission to said base station.

4. The system according to claim 1 wherein said communication path between said selection distribution unit and said base station comprises a T1 span.

5. The system according to claim 1 wherein said base station monitors said power levels of communications received from said mobile unit and adjusts said power levels by sending power control bits to said mobile unit, causing said mobile unit to adjust its output power accordingly.

6. The system according to claim 5 wherein said increased power bias message comprises power control bits sent by said base station to said mobile unit instructing said mobile unit to increase its output power.

7. The system according to claim 6 wherein said base station identifies the end of said critical message from said mobile unit and discontinues biasing said outer loop threshold which drives power control bits to said mobile unit in response thereto.

8. The system according to claim 1 wherein said base station sends a series of power control bits to said mobile unit and said mobile unit responds by adjusting its power level, accordingly.

9. The system according to claim 8 wherein said increased power bias message is implemented at said mobile with said series of forward power control bits sent from said base station to said mobile station.

10. The system according to claim 8 wherein said increased power bias message translates to power-up bits transmitted from said base station to said mobile unit.

11. The system according to claim 1 wherein said selection distribution unit comprises a look up table identifying critical signaling messages and a comparator comparing signaling messages received by said selection distribution unit to said look-up table.

12. The system according to claim 1 further comprising a call processing processor coupled to said selection distribution unit and sending forward signaling messages to said selection distribution unit.

13. The system according to claim 1 wherein said base station detects the end of said critical reverse signaling message and transmits forward power control bits to said mobile unit to allow the power level of said mobile unit to decay from levels required by said critical forward power control message.

14. An improved over-the-air communication system for controlling communication between a mobile unit and an infrastructure, comprising:

a base station comprising a receiver configured to receive communication signals from said mobile unit;

a selection distribution unit operatively coupled to said receiver;

said selection distribution unit comprising an analyzer receiving said communication signals and analyzing said communication signals to identify a critical signaling message transmitted by said mobile unit that requires said mobile unit to send a critical response comprising a critical signaling message and for forwarding said critical signaling message to said base station along with an increase power bias command; and said base station operatively coupled to said selection distribution unit, said base station responsive to said increase power bias command to send an increase power bias message to said mobile unit instructing said mobile unit to respond to said critical signaling message by sending a critical response to said base station with an increased power bias.

15. The system according to claim 1 wherein said base station sends a series of power control bits comprising a series of power-up bits to said mobile unit and said mobile unit responds by adjusting its power level accordingly.

16. The system according to claim 14 further comprising a call processing processor coupled to said selection distribution unit and sending forward signaling messages to said selection distribution unit.

17. The system according to claim 14 wherein said base station detects the end of said critical reverse signaling message and transmits a forward power control bits to said mobile unit to allow the power level of said mobile unit to decay from levels required by said critical forward power control message.

18. The system according to claim 14 wherein said base station monitors the power levels of communications received from said mobile unit and adjusts the power levels by sending power control bits to said mobile unit, causing said mobile unit to adjust its output power accordingly.

19. The system according to claim 18 wherein said base station identifies the end of said critical message from said mobile unit and discontinues sending power-up bits to said mobile unit in response thereto.

20. The system according to claim 14 further comprising a transcoder for sending speech frames to said selection distribution unit.

21. The system according to claim 14 wherein said selection distribution unit combines said signaling messages with said speech information for transmission to said base station.

22. The system according to claim 14 wherein said communication path between said selection distribution unit and said base station comprises a T1 span.

23. The system according to claim 14 wherein said selection distribution unit comprises a look up table identifying critical signaling messages and a comparator comparing signaling messages received by said selection distribution unit to said look-up table.

24. A method of communicating critical information over-the-air, between a mobile unit and a base station, comprising the steps of:

providing a source of signaling messages;

providing an input in said base station to receive said signaling messages;

identifying in said signaling messages, a signaling message which requires said mobile unit to send a critical response comprising a critical signaling message of predetermined duration; and sending a forward increase power bias command from said base station via power control bits to said mobile unit instructing said mobile unit to increase transmission power while transmitting said critical response to said base station.

25. The method of claim 24 further comprising the steps of:

providing a transcoder;

sending speech frames from said transcoder to said base station; and sending speech frames along with signaling messages from said base station to said mobile unit.

26. The method of claim 24 further comprising the steps of:

providing a selection distribution unit;

combining in said selection distribution unit signaling messages with said speech frames; and communicating the output of said selection distribution unit to said base station for transmission to said mobile unit.

27. The method of claim 26 wherein said step of identifying said critical signaling messages carried out in said selection distribution unit and said selection distribution unit communicates the forward increase power bias command to said base station.

28. The method of claim 27 further comprising the steps of:

monitoring in said base station the power levels of communications received from said mobile unit; and adjusting the power levels of said mobile unit by sending power control bits to said mobile unit, causing said mobile unit to adjust its output power accordingly.

29. The method of claim 28 wherein said base station responds to the forward increase power bias command by sending power-up bits to said mobile unit instructing said mobile unit to increase its output power.

30. The method of claim 29 further comprising the steps of monitoring the transmission power of said mobile unit during transmission of said critical response;

maintaining the increase bias power of said mobile unit during transmission of said critical response; and instructing said mobile unit to cease transmission at increase power, allowing the transmission power of mobile unit to decay, after said critical response is sent.

* * * * *

UNITED STATES PATENT AND TRADEMARK OFFICE
CERTIFICATE OF CORRECTION

PATENT NO. : 6,782,272 B2
DATED : August 24, 2004
INVENTOR(S) : Morgan et al.

It is certified that error appears in the above-identified patent and that said Letters Patent is hereby corrected as shown below:

<u>Title page,</u>
Item [75], Inventors, delete "Woodstook" and insert -- Woodstock --;

<u>Column 8,</u>
Line 57, delete "a".

Signed and Sealed this

Third Day of May, 2005

JON W. DUDAS
*Director of the United States Patent and Trademark Office*